United States Patent
Park et al.

(10) Patent No.: US 11,056,932 B2
(45) Date of Patent: *Jul. 6, 2021

(54) WIRELESS CHARGING APPARATUS AND METHOD

(71) Applicant: SAMSUNG ELECTRONICS CO., LTD., Suwon-si (KR)

(72) Inventors: Sung-Bum Park, Suwon-si (KR); Se-Ho Park, Suwon-si (KR); Young-Min Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,514

(22) Filed: Mar. 12, 2020

(65) Prior Publication Data
US 2020/0212727 A1 Jul. 2, 2020

Related U.S. Application Data

(63) Continuation of application No. 15/832,618, filed on Dec. 5, 2017, now Pat. No. 10,601,263, which is a (Continued)

(30) Foreign Application Priority Data

May 17, 2011 (KR) .................. 10-2011-0046316
May 16, 2012 (KR) .................. 10-2012-0052123

(51) Int. Cl.
*H02J 50/10* (2016.01)
*H02J 50/80* (2016.01)
*H02J 7/00* (2006.01)

(52) U.S. Cl.
CPC .............. *H02J 50/80* (2016.02); *H02J 50/10* (2016.02); *H02J 7/0047* (2013.01); *H02J 7/0049* (2020.01); *Y02D 30/70* (2020.08)

(58) Field of Classification Search
CPC .......... H02J 50/80; H02J 50/10; H02J 7/0049; H02J 7/0047; H02J 20/12; Y02D 30/70; H04B 5/02
See application file for complete search history.

(56) References Cited

U.S. PATENT DOCUMENTS 5,070,293 A 12/1991 Ishii et al.
7,893,564 B2 2/2011 Bennett
(Continued)

FOREIGN PATENT DOCUMENTS

JP 7-203634 8/1995
JP 2000-236632 8/2000
(Continued)

OTHER PUBLICATIONS

Communication pursuant to Article 94(3) dated Apr. 24, 2020 in counterpart EP Application No. 19169115.3.
(Continued)

*Primary Examiner* — Nghia M Doan
(74) *Attorney, Agent, or Firm* — Nixon & Vanderhye, P.C.

(57) ABSTRACT

Methods and apparatus for wireless charging are provided. Transmission power transmitted from a wireless power transmitter is received at a power receiver of a wireless power receiver. A battery of the wireless power receiver is charged with the received transmission power. It is determined whether the battery is fully charged. A packet from a communication unit of the wireless power receiver is transmitted to the wireless power transmitter when the battery is fully charged. An auxiliary charge of the battery is performed by receiving strength-reduced transmission power from the wireless power transmitter.

8 Claims, 3 Drawing Sheets

Related U.S. Application Data continuation of application No. 14/657,482, filed on Mar. 13, 2015, now Pat. No. 9,859,746, which is a continuation of application No. 13/474,300, filed on May 17, 2012, now Pat. No. 9,000,723.

(56) References Cited

U.S. PATENT DOCUMENTS

| | | | |
|---|---|---|---|
| 7,898,215 B2 | 3/2011 | Nagatsuka | |
| 8,610,401 B2 | 12/2013 | Kim et al. | |
| 9,000,723 B2 * | 4/2015 | Park | H02J 50/10 320/109 |
| 9,806,767 B2 | 10/2017 | Walley et al. | |
| 9,859,746 B2 * | 1/2018 | Park | H02J 7/025 |
| 10,601,263 B2 * | 3/2020 | Park | H02J 50/10 |
| 2008/0197802 A1 | 8/2008 | Onishi et al. | |
| 2008/0211455 A1 | 9/2008 | Park et al. | |
| 2009/0156268 A1 | 6/2009 | Kim et al. | |
| 2009/0237029 A1 | 9/2009 | Andelfinger | |
| 2009/0278505 A1 | 11/2009 | Toya et al. | |
| 2010/0001845 A1 | 1/2010 | Yamashita | |
| 2010/0207771 A1 | 8/2010 | Trigiani | |
| 2011/0225073 A1 | 9/2011 | Won | |
| 2012/0289283 A1 | 11/2012 | Jiang | |
| 2013/0179061 A1 | 7/2013 | Gadh et al. | |
| 2014/0197785 A1 | 7/2014 | Lee | |

FOREIGN PATENT DOCUMENTS

| | | |
|---|---|---|
| JP | 2008-103196 | 5/2008 |
| JP | 2009-087648 | 4/2009 |
| JP | 2009-273327 | 11/2009 |
| JP | 2010-016985 | 1/2010 |
| KR | 10-0792311 | 1/2008 |
| WO | 2008/044875 | 4/2008 |

OTHER PUBLICATIONS

Anonymous, "Float Voltage—Wikipedia," Jan. 25, 2011, XP055687584, 1 page, retrieved Apr. 20, 2020.

Notice of Allowance dated Aug. 21, 2017 in U.S. Appl. No. 14/657,482 filed Mar. 13, 2015.

Search Report dated May 21, 2015 in counterpart European Patent Application No. 12785530.2.

Communication Pursuant to Article 94(3)EPC dated Oct. 11, 2017 in counterpart European Patent Application No. 12785530.2.

Notification of Reasons for Rejection dated May 1, 2018 in counterpart Korean Patent Application No. 10-2012-0052123 and English-language translation.

Decision of Grant dated May 1, 2019 in counterpart Korean Patent Application No. 10-2012-0052123 and English-language translation.

Extended Search Report dated Jun. 21, 2019 in counterpart European Patent Application No. 19169115.3.

"System Description Wireless Power Transfer vol. I: Low Power, Part 1: Interface Definition," Version 1.0.1, Oct. 2010, XP055217681; retrieved from the Internet.

Park et al., U.S. Appl. No. 13/474,300, filed May 17, 2012.
Park et al., U.S. Appl. No. 14/657,482, filed Mar. 13, 2015.
Park et al., U.S. Appl. No. 15/832,618, filed Dec. 5, 2017.

* cited by examiner

| | b7 | b6 | b5 | b4 | b3 | b2 | b1 | b0 |
|---|---|---|---|---|---|---|---|---|
| B0 | Charge Status Value | | | | | | | |

WIRELESS CHARGING APPARATUS AND METHOD

CROSS-REFERENCE TO RELATED APPLICATIONS

This application is a continuation of U.S. application Ser. No. 15/832,618, filed on Dec. 5, 2017, which is a continuation of U.S. application Ser. No. 14/657,482, filed on Mar. 13, 2015, now U.S. Pat. No. 9,859,746, which is a continuation of U.S. application Ser. No. 13/474,300, filed on May 17, 2012, now U.S. Pat. No. 9,000,723, which is based on and claims priority under 35 10 U.S.C. § 119 to Korean Patent Application No. 10-2011-0046316, filed on May 17, 2011 in the Korean Intellectual Property Office and to Korean Patent Application No. 10-2012-0052123, filed on May 16, 2012 in the Korean Intellectual Property Office. The contents of each of these applications are incorporated by reference herein in their entirety.

BACKGROUND OF THE INVENTION

1. Field of the Invention

The present invention relates generally to a wireless charging apparatus and method, and more particularly, to a wireless charging apparatus and method that uses a wireless power receiver to wirelessly receive power from a wireless power transmitter and that charges a battery with the received power.

2. Description of the Related Art

With the continued improvements in the field of Information Technology (IT) and the increasing prevalence of a wide variety of portable electronic products, a variety of techniques have been developed that supply power for portable electronic products. Technology for supplying power typically used a power line in the past. However, wireless power transmission technology, which is capable of wirelessly supplying power, has recently been developed.

Wireless power transmission technology includes technology for delivering electrical energy in the form of electromagnetic waves, electromagnetic induction, or electromagnetic resonance, for example. Wireless power transmission technology makes it possible to supply power wirelessly anytime and anywhere, without the use of power lines, such as, electric wires. This wireless power transmission technology is a core technology for wirelessly charging electronic devices, supplying wireless power for and/or wirelessly charging electric cars, supplying wireless power to remote places, and supplying power to ubiquitous wireless sensors. Thus wireless power transmission technology has attracted the attention of the public as a promising technology to replace the existing schemes of supplying power for and/or charging electronic devices using electric wires.

For example, when wireless power transmission technology is used for a wireless charging apparatus, the wireless charging apparatus may include a wireless power transmitter for supplying power, and a wireless power receiver for receiving power and charging its battery with the received power. The wireless power transmitter may detect when an object is put on a source resonator by measuring a change in load or a change in resonant frequency from a wireless charging standby state. Upon detecting that the object is put on the source resonator, the wireless power transmitter determines whether the object is an object that may undergo wireless charging, or whether the object is just a metallic object, by performing an authentication process, such as, for example, exchanging an IDentifier (ID) with the object. If the authentication is successful, the wireless power transmitter starts negotiations on power transmission, thereby determining that the object put on the source resonator is a wireless rechargeable-charger (e.g., a wireless power receiver). Upon completion of the negotiations, the wireless power transmitter starts supplying wireless power for charging of the wireless power receiver so that the wireless power receiver may be charged. The wireless power transmitter determines whether the wireless power receiver has been fully charged, and stops its power transmission to the wireless power receiver if the wireless power receiver has been fully charged.

In the conventional wireless charging scheme described above, the wireless power transmitter stops its wireless power transmission when the wireless power receiver sends an End Power Transfer (EPT) packet to the wireless power transmitter. Therefore, the wireless power receiver may not perform an auxiliary charge. The term 'auxiliary charge', as used herein, may refer to charging that is conducted to supplement the power that has been self-discharged or consumed during use of the wireless power receiver with a full charge status displayed on UI.

Since the conventional wireless charging apparatus cannot perform an auxiliary charge, a User Interface (UI) screen may not display a full charge status with the transmission of wireless power interrupted.

Therefore, although the wireless charging apparatus has performed wireless charging for a long time, the user may misjudge that the wireless charging apparatus is out of order or malfunctions, because the user can not perceive the full charge status on User Interface (UI) screen.

When the battery power of the wireless power receiver drops below a predetermined amount of power due to discharge while in the fully charged state, the wireless power receiver performs recharging instead of the auxiliary charge. During recharging, the wireless power receiver displays a charging status on the UI. Thus, the user may not be able to determine whether the wireless power receiver is performing recharging after being fully charged, or the wireless power receiver is being continuously charged before being fully charged. For example, the user may misjudge that the wireless power receiver is being continuously charged without being fully charged, even though the wireless power receiver is actually being recharged after it was fully charged.

SUMMARY OF THE INVENTION

The present invention has been made to address at least the above problems and/or disadvantages and to provide at least the advantages described below. Accordingly, an aspect of the present invention provides a wireless power receiver that includes a communication unit, a power receiver configured to receive transmission power transmitted from a wireless power transmitter at a power receiver of the wireless power receiver, a battery configured to charge with the received transmission power, and a Power Management Integrated Circuit (PMIC) configured to determine whether the battery is fully charged, to control the communication unit to transmit a Charge Status (CS) packet to the wireless power transmitter when the battery is fully charged and to perform an auxiliary charge of the battery by receiving strength-reduced transmission power from the wireless power transmitter.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
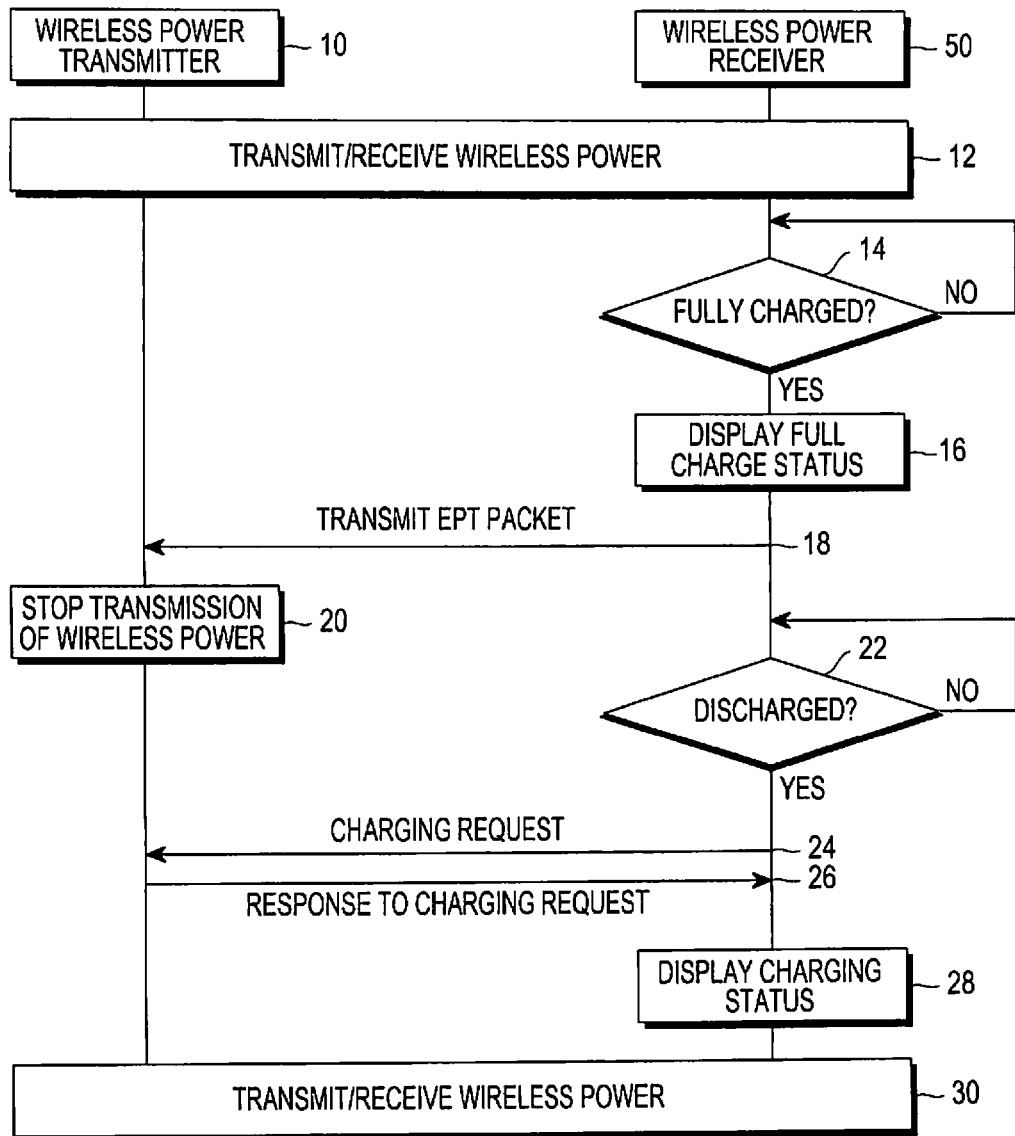
FIG. 1 is a flow diagram illustrating a wireless charging operation of a wireless charging apparatus that cannot perform an auxiliary charge.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention provide a wireless charging apparatus and method for performing an auxiliary charge upon completion of wireless charging between a wireless power transmitter and a wireless power receiver. The wireless charging apparatus may be used for wirelessly charging electronic devices, supplying wireless power for and/or wirelessly charging electric cars, supplying wireless power to remote places, and supplying power to ubiquitous wireless sensors. The wireless charging apparatus may be applied to any devices that can perform wireless power transmission and perform charging by receiving wireless power.

A wireless charging operation of a wireless charging apparatus that cannot perform auxiliary charge is described in detail below. Thereafter, a wireless charging apparatus and method are described, which perform an auxiliary charge upon completion of wireless charging.

FIG. 1 is a flow diagram illustrating a wireless charging operation between a wireless power transmitter and a wireless power receiver, in which an auxiliary charge is not supported. Referring to FIG. 1, a wireless power transmitter 10 charges, or recharges, a battery in a wireless power receiver 50 by transmitting and receiving wireless power, in step 12.

In step 14, the wireless power receiver 50 determines whether it is in a fully charged state in which its battery is fully charged. If the wireless power receiver 50 is in the fully charged state, the wireless power receiver 50 displays the full charge status indicating that charging of the wireless power receiver 50 is complete. The full charge status is displayed on a UI screen implemented by a display module, such as a Liquid Crystal Display (LCD), so that a user of the wireless power receiver may recognize the fully charged state, in step 16.

In step 18, the wireless power receiver 50 transmits an End Power Transfer (EPT) packet, having a Charge Complete message, to the wireless power transmitter 10 in accordance with the Wireless Power Consortium (WPC) 1.1 standard.

Upon receiving the EPT packet from the wireless power receiver 50, the wireless power transmitter 10 stops the transmission of wireless power, in step 20. While the wireless power receiver 50 receives no power, the fully charged battery is discharged little by little, and the full charge status will disappear from the UI screen.

In step 22, the wireless power receiver 50 determines whether the charged power is less than or equal to a predetermined power due to the above-described battery discharge. If the battery power is less than or equal to the predetermined power, the wireless power receiver 50 sends a charging request to the wireless power transmitter 10, in step 24.

In step 26, the wireless power transmitter 10 sends a response to the charging request to the wireless power receiver 50. In step 28, upon receiving the response to the charging request, the wireless power receiver 50 displays a charging status indicating that the wireless power receiver 50 is charging its battery. The charging status is displayed on the UI screen so that the user may recognize that the wireless power receiver 50 is charging its battery.

Thereafter, in step 30, the wireless power transmitter 10 charges the wireless power receiver 50 by transmitting and receiving wireless power. Steps 14 to 30 may be repeated until wireless power transmission/reception is impossible due to, for example, separating the wireless power receiver 50 from the wireless power transmitter 10.

In the wireless charging apparatus and method described above, the wireless power transmitter 10 stops the transmission of wireless power when the wireless power receiver 50 sends an EPT packet to the wireless power transmitter 10. Accordingly, the wireless power receiver 50 is prevented from performing an auxiliary charge.

Due to the inability of the wireless charging receiver 50 to perform the auxiliary charge, the wireless power receiver 50 doesn't display a full charge status with its charging interrupted. Thus, if the wireless power receiver 50 doesn't display a full charge status despite the lapse of a full charge time, the user may consider that the wireless charging apparatus is out of order or malfunctions.

In addition, if the battery power is less than or equal to a predetermined power due to the discharge occurring in the fully charged state, the wireless power receiver 50 will perform recharging. The wireless power receiver 50 displays a charging status on the UI. The user may not be able to determine whether the wireless power receiver 50 is performing recharging after being fully charged, or the wireless power receiver 50 is being continuously charged before being fully charged. For example, the user may misjudge that the wireless power receiver 50 is being continuously charged without being fully charged, even though it is actually being recharged after it was fully charged.

Accordingly, an embodiment of the present invention provides a wireless charging apparatus and method capable of performing an auxiliary charge upon completion of the wireless charging between a wireless power transmitter and a wireless power receiver.

Figure 2:
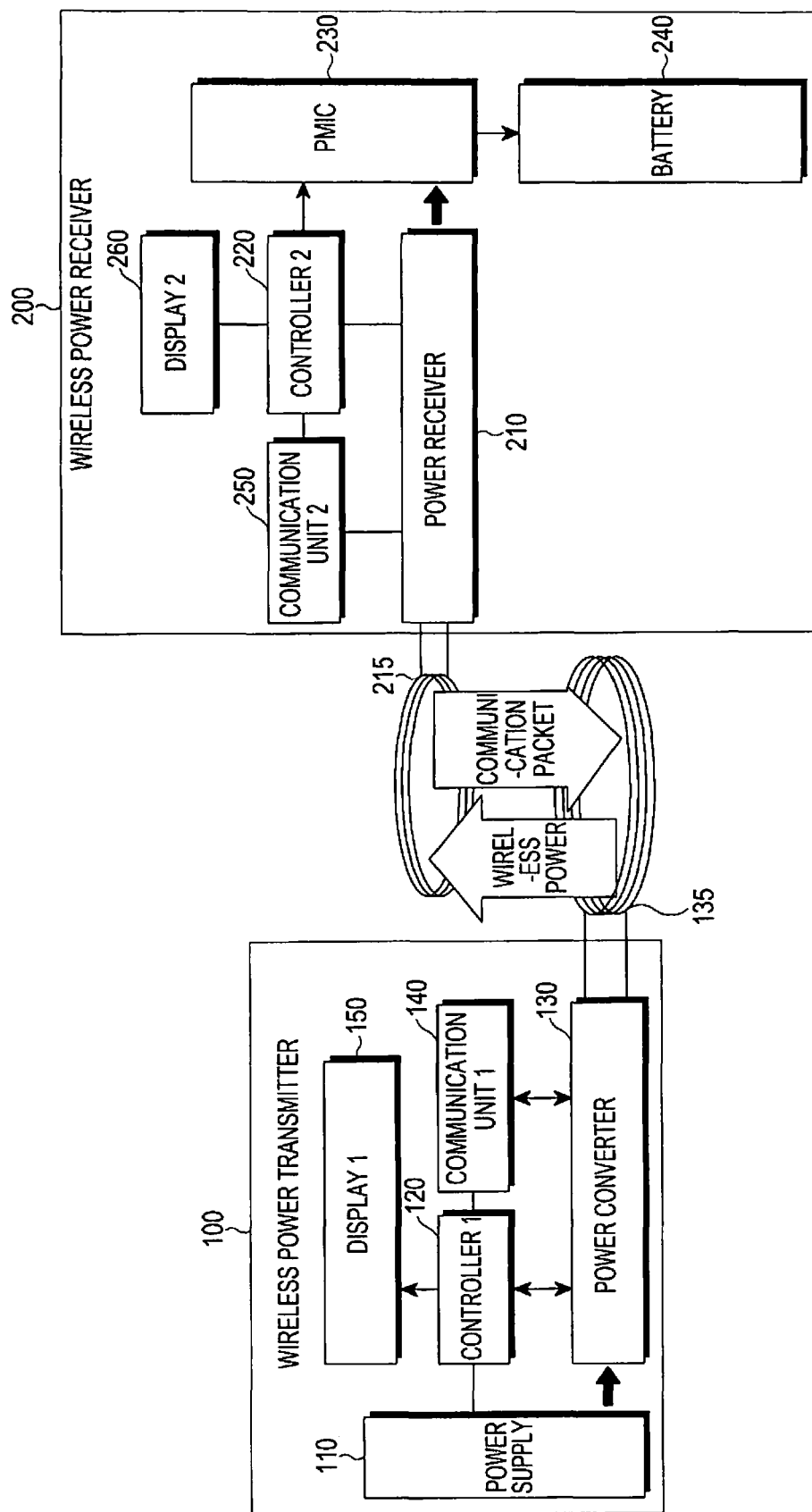
FIG. 2 is a diagram illustrating a structure of a wireless charging apparatus, according to an embodiment of the present invention.

FIG. 2 is a diagram illustrating s structure of a wireless charging apparatus, according to an embodiment of the present invention.

Referring to FIG. 2, the wireless charging apparatus includes a wireless power transmitter 100 and a wireless power receiver 200.

The wireless power transmitter 100, which may be embodied as a charging pad, for example, includes a power supply 110, a first controller 120, a power converter 130, a first coil 135, a first communication unit 140, and a first display 150.

The power supply 110, which is a power source, supplies necessary power to the wireless power transmitter 100 and supplies Direct Current (DC) power for wireless power transmission.

The first controller 120, which controls the overall operation of the wireless power transmitter 100, generates various messages needed for wireless power transmission, sends the generated messages to the first communication unit 140, receives messages from the first communication unit 140, and performs control corresponding thereto. The first controller 120 calculates an amount of transmission power based on the information received from the wireless power receiver 200, and controls the power converter 130 to convert the transmission power. If a CS packet is received through the first communication unit 140 when a battery 240 in the wireless power receiver 200 is fully charged, the first controller 120 detects full charge status information included in the CS packet. The CS packet includes information indicating a battery charge level, and may have a value of 1 to 100. A value of 1 indicates that the battery 240 is almost completely uncharged, and a value of 100 indicates that the battery 240 is fully charged. In the latter case, where the battery 240 in the wireless power receiver 200 is fully charged, the wireless power receiver 200 may transmit a CS packet with a value of 100. Upon receiving a CS packet indicating the full charge of the battery 240 in the wireless power receiver 200, the first controller 120 controls the first display 150 to display full charge status information thereon, and controls the power converter 130 to reduce a strength of the wireless power to a predetermined strength.

The power converter 130 converts a DC voltage provided from the power supply 110 into transmission power so that the converted transmission power may be transmitted to the wireless power receiver 200 through resonance by the first coil 135. The first coil 135 resonates at the same frequency as that of a second coil 215 in the wireless power receiver 200 so that the transmission power may be transmitted to the wireless power receiver 200. If the wireless power receiver 200 is fully charged, the power converter 130 reduces the strength of the wireless power (or the strength of transmission power) under control of the first controller 120. The power converter 130 may reduce the strength of the transmission power so that a predetermined voltage (e.g., 5V) may be maintained, thereby also maintaining the power transmission.

The first communication unit 140 forwards a message (e.g., a CS packet) received from the wireless power receiver 200 to the first controller 120. The first communication unit 140 also sends a message from the wireless power transmitter 100 to the wireless power receiver 200 under control of the first controller 120.

The first display 150 may be a display module, such as, for example, a Light Emitting Diode (LED) or Liquid Crystal Display (LCD), which displays full charge status information indicating that the wireless power receiver 200 has been fully charged, under control of the first controller 120.

The wireless power receiver 200 charges its battery 240 with the power wirelessly provided from the wireless power transmitter 100, configured as described above. The wireless power receiver 200 may be embodied as a mobile terminal, for example, and includes the second coil 215, a power receiver 210, a second controller 220, a Power Management Integrated Circuit (PMIC, or power management chip) 230, the battery 240, a second communication unit 250, and a second display 260.

If the second coil 215, a resonant coil, is aligned with the first coil 135 in the wireless power transmitter 100, an induced current may occur in the second coil 215 due to changes in the magnetic field of the first coil 135. The second coil 215 resonates at the same frequency as that of the first coil 135 so that the wireless power may be received at the power receiver 210.

The power receiver 210 receives the transmission power from the wireless power transmitter 100 through the second coil 215, and forwards the received power to the PMIC 230.

The second controller 220, which controls the overall operation of the wireless power receiver 200, generates various messages needed for wireless power reception, sends the generated messages to the second communication unit 250, receives messages from the second communication unit 250, and performs control corresponding thereto. The second controller 220 controls the power receiver 210 to receive the power transmitted from the wireless power transmitter 100, and controls the PMIC 230 so that the received power may be charged in the battery 240. The second controller 220 may receive a full charge message from the PMIC 230 when the battery 240 is fully charged. Upon receiving the full charge message, the second controller 220 controls the second communication unit 250 to transmit a CS packet with a value of 100, which indicates that the battery 240 is fully charged. If the battery 240 is fully charged, the second controller 220 controls the second display 260 to display the full charge status thereon.

The PMIC 230, a power management chip, charges the battery 240 with the power that the power receiver 210 has received. The PMIC 230 monitors the current charge in the battery 240 and the voltage of the battery 240. If the battery 240 arrives at a full charge condition, the PMIC 230 performs an auxiliary charge while maintaining a jig-on voltage (a voltage fixedly provided to the PMIC 230 at 5V, and sends a full charge message to the second controller 220.

If the battery 240 is fully charged, the second communication unit 250 transmits a CS packet to the wireless power transmitter 100, receives a message from the wireless power transmitter 100, and forwards it to the second controller 220, under control of the second controller 220. The CS packet includes information indicating a charge level of the battery 240, and may have a value of 1 to 100, as described above.

The second display 260 may be embodied as a display module, such as, for example, an LED or an LCD, and displays full charge status information indicating that the battery 240 in the wireless power receiver 200 has been fully charged, under control of the second controller 220.

In the wireless charging apparatus described in the embodiment of the present invention above, if the battery 240 in the wireless power receiver 200 is fully charged, the wireless power receiver 200 sends a CS packet, instead of an EPT packet, to the wireless power transmitter 100. Accordingly, an auxiliary charge is performed so that the power transmitted from the wireless power transmitter 100 is continuously transmitted after being reduced, without being interrupted. This prevents the repeated charging and recharging of the battery 240.

Figures 3, 4:
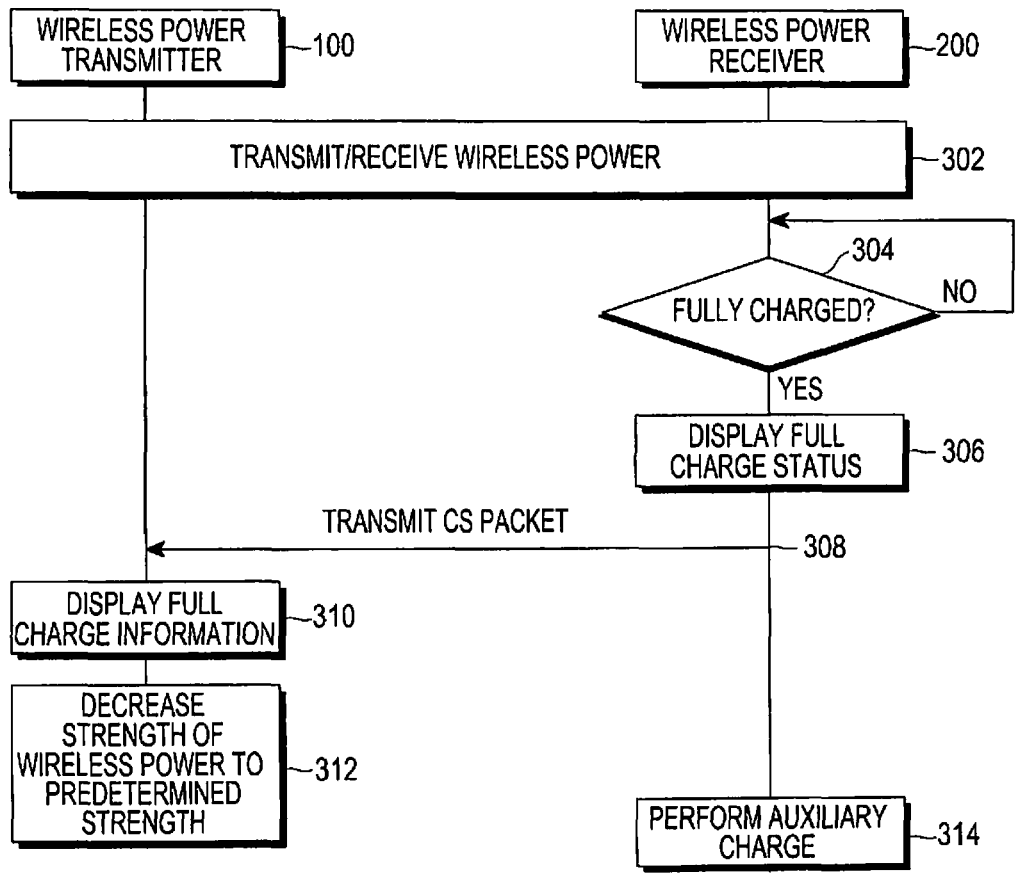
FIG. 3 is a flow diagram illustrating a wireless charging method, according to an embodiment of the present invention.
FIG. 4 is a diagram illustrating a structure of a Charge Status (CS) packet, according to an embodiment of the present invention.

FIG. 3 is a flow diagram illustrating a wireless charging method, according to an embodiment of the present invention.

Referring to FIG. 3, in step 302, the wireless power transmitter 100 and the wireless power receiver 200 charge the battery 240 in the wireless power receiver 200 by transmitting and receiving wireless power.

In step 304, the wireless power receiver 200 determines whether it is in a fully charged state, in which battery charging has been completed. If the wireless power receiver 200 is in the fully charged state, the wireless power receiver 200 displays a full charge status, indicating the completed charging of the wireless power receiver 200, on a UI screen of the second display 260, implemented by a display module such as LCD, in step 306.

In step 308, the wireless power receiver 200 transmits a CS packet to the wireless power transmitter 100. The CS packet includes information indicating a charge level of the battery 240, and may have a value of 1 to 100, as described above.

FIG. 4 is a diagram illustrating a structure of a CS packet, according to an embodiment of the present invention.

Referring to FIG. 4, for the CS packet, a CS packet type defined in the WPC 1.1 standard may be used. B0 represents one byte, which may include 8 bits of b7~b0. In an embodiment of the present invention, if the battery 240 is fully charged, a CS Value may be 0~63 to indicate a value of 100.

Upon receiving the CS packet from the wireless power receiver 200, the wireless power transmitter 100 displays full charge status information on the first display 150 in step 310. The wireless power transmitter 100 reduces transmission strength of the wireless power while maintaining the wireless power transmission without interruption, in step 312.

In step 314, the wireless power receiver 200 receives the reduced wireless power from the wireless power transmitter 100 and keeps a predetermined fixed voltage, thereby performing an auxiliary charge.

As is apparent from the foregoing description, the wireless charging apparatus and method of embodiments of the present invention enable an auxiliary charge upon completion of wireless charging between the wireless power transmitter and the wireless power receiver, making it possible for the user to identify the exact full charge status information in the fully charged state. By enabling the auxiliary charge upon completion of the wireless charging between the wireless power transmitter and the wireless power receiver, it is possible that even though the battery is recharged due to the discharge after it was fully charged, the user may not recognize this situation.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A mobile terminal comprising:
a coil;
a battery;
a display;
a communication unit;
a power receiver configured to:
receive first power from a wireless power transmitter through the coil to provide the received first power to a power management integrated circuit, PMIC, and
receive second power from the wireless power transmitter through the coil to provide the received second power to the PMIC while the battery is in a fully charged state, wherein the second power is lower than the first power and the second power is continuously transmitted from the wireless power transmitter without being interrupted, the PMIC configured to:
perform charging of the battery based on the provided first power, and
while the battery is in the fully charged state, perform an auxiliary charging of the battery based on the provided second power having a predetermined voltage, wherein the power receiver is adapted to keep the predetermined voltage provided to the PMIC during the fully charged state, wherein the auxiliary charging is performed to supplement power that is self discharged,
a controller configured to at least:
control the communication unit to send a message indicating the fully charged state of the battery to the wireless power transmitter upon receiving a full charge message from the PMIC, and
upon receiving the full charge message from the PMIC, control to display a full charge status on the display while the battery is in the fully charged state.

2. The mobile terminal according to claim 1, wherein the message sent to the wireless power transmitter includes information indicating a charge level of the battery.

3. The mobile terminal according to claim 1, wherein the controller is configured to perform authentication.

4. The mobile terminal according to claim 1, wherein the PMIC is further configured to provide the full charge message based on the fully charged state of the battery.

5. A method for operating a mobile terminal comprising a coil, a battery, a display, a communication unit, a power receiver for receiving transmission power from a wireless power transmitter through the coil; a power integrated management circuit, PMIC, configured to charge the battery with the received transmission power; and a controller, the method including:
by the PMIC,
while the power receiver receives first power from a wireless power transmitter through the coil to provide the received first power to the PMIC, performing, by the PMIC, a charge of the battery based on the provided first power, and
while the battery is in a fully charged state:
while power receiver receives second power from the wireless power transmitter through the coil to provide the received second power to the PMIC, performing an auxiliary charge of the battery based on the provided second power having a predetermined voltage, wherein the power receiver is adapted to keep the predetermined voltage provided to the PMIC during the fully charged state, wherein the auxiliary charging is performed to supplement power that is self-discharged, wherein the second power is lower than the first power and the second power is continuously transmitted from the wireless power transmitter without being interrupted; and
by the controller,
controlling the communication unit to send a message indicating the fully charged state of the battery to the wireless power transmitter upon receiving a full charge message from the PMIC, and upon receiving the full charge message from the PMIC, controlling to display a full charge status on the display while the battery is in the fully charged state.

6. The method according to claim 5, wherein the message sent to the wireless power transmitter includes information indicating a charge level of the battery.

7. The method according to claim 5, further comprising performing authentication.

8. The method according to claim 5, further comprising:
providing, by the PMIC, the full charge message based on the fully charged state of the battery.

* * * * *